(12) United States Patent
Gupta et al.

(10) Patent No.: US 11,753,960 B2
(45) Date of Patent: Sep. 12, 2023

(54) NOZZLE VANE

(71) Applicant: MITSUBISHI HEAVY INDUSTRIES ENGINE & TURBOCHARGER, LTD., Sagamihara (JP)

(72) Inventors: Bipin Gupta, Tokyo (JP); Toyotaka Yoshida, Tokyo (JP); Yosuke Dammoto, Sagamihara (JP); Yoji Akiyama, Sagamihara (JP); Jain Sambhav, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 140 days.

(21) Appl. No.: 17/430,454

(22) PCT Filed: Feb. 25, 2019

(86) PCT No.: PCT/JP2019/007142
§ 371 (c)(1),
(2) Date: Aug. 12, 2021

(87) PCT Pub. No.: WO2020/174550
PCT Pub. Date: Sep. 3, 2020

(65) Prior Publication Data
US 2022/0120190 A1    Apr. 21, 2022

(51) Int. Cl.
*F01D 17/16* (2006.01)
*F01D 5/14* (2006.01)

(52) U.S. Cl.
CPC .......... *F01D 17/165* (2013.01); *F01D 5/141* (2013.01); *F05D 2220/40* (2013.01); *F05D 2240/124* (2013.01); *F05D 2250/90* (2013.01)

(58) Field of Classification Search
CPC .......... F01D 17/165; F01D 17/16; F01D 5/141
See application file for complete search history.

(56) References Cited

U.S. PATENT DOCUMENTS

| 7,305,826 B2 | 12/2007 | Kuster |
| 10,138,744 B2 * | 11/2018 | Vemula .................. F02B 37/24 |
| 10,731,503 B2 * | 8/2020 | Yoshida .................. F01D 5/048 |

FOREIGN PATENT DOCUMENTS

WO    WO-2017168635 A1 * 10/2017 .......... F01D 17/165

OTHER PUBLICATIONS

International Search Report, issued PCT/JP2019/007142, dated Apr. 16, 2019.
Written Opinion of the International Searching Authority, issued PCT/JP2019/007142, dated Apr. 16, 2019.

* cited by examiner

*Primary Examiner* — Courtney D Heinle
*Assistant Examiner* — John S Hunter, Jr.
(74) *Attorney, Agent, or Firm* — BIRCH, STEWART, KOLASCH & BIRCH, LLP

(57) ABSTRACT

A nozzle vane of a variable geometry turbocharger comprises: a nozzle vane body rotatably disposed in an exhaust gas passage defined between a shroud surface and a hub surface; and a fin disposed on at least one of a pressure surface or a suction surface of the nozzle vane body and disposed within a range of 0.6L from a trailing edge of the nozzle vane body, where L refers to a chord length of the nozzle vane body. The fin satisfies a relationship of $0.3L \leq X$, where X refers to a length of the fin along a chord direction of the nozzle vane body.

10 Claims, 11 Drawing Sheets

PRIOR ART
FIG. 6A
FIG. 6B
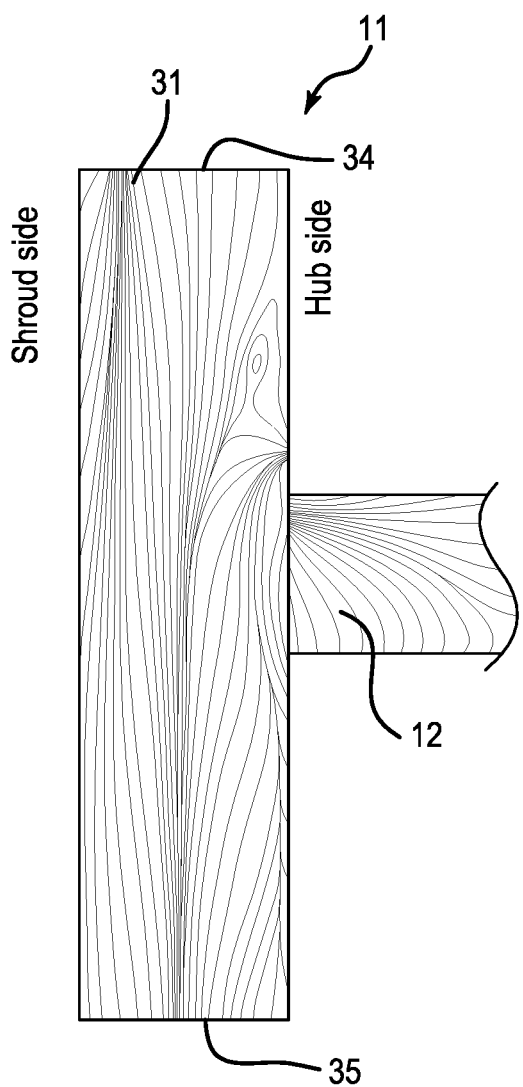
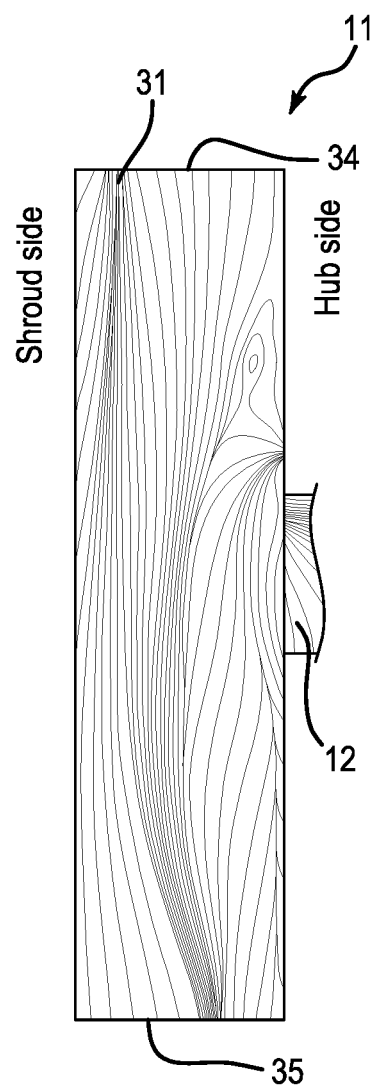

NOZZLE VANE

TECHNICAL FIELD

The present disclosure relates to a nozzle vane for a variable geometry turbocharger.

BACKGROUND

In recent years, various variable geometry turbochargers which can change the flow characteristics of exhaust gas by adjusting the nozzle opening degree have been developed to improve fuel efficiency. A configuration of a nozzle vane of such a variable geometry turbocharger is disclosed in Patent Document 1.

CITATION LIST

Patent Literature

Patent Document 1: U.S. Pat. No. 7,305,826B2

SUMMARY

Problems to be Solved

A nozzle vane of a variable geometry turbocharger is rotatably disposed in an exhaust gas passage defined between a shroud surface and a hub surface, and there are gaps on both sides of the nozzle vane between each side and the shroud surface or the hub surface. Due to the difference in the flow rate or pressure of exhaust gas flowing into the gaps, the nozzle vane may be moved by a force in the direction of the axis of rotation. Therefore, if the opening degree of the nozzle vane is changed while the nozzle vane is in contact with, for example, a nozzle plate on the shroud surface side or a nozzle mount on the hub surface side, friction may cause wear.

In this regard, Patent Document 1 discloses a configuration for mitigating the pressure difference generated on both sides of the nozzle vane by providing a communication hole in the valve body of the nozzle vane to connect the shroud side and the hub side, but it does not disclose any findings for controlling the force applied to the nozzle vane due to the pressure difference as desired.

In view of the above, an object of at least one embodiment of the present disclosure is to provide a nozzle vane that can control a force applied in the rotational axis direction of the nozzle vane in a variable geometry turbocharger.

Solution to the Problems (1) A nozzle vane according to at least one embodiment of the present invention is a nozzle vane of a variable geometry turbocharger, comprising: a nozzle vane body rotatably disposed in an exhaust gas passage defined between a shroud surface and a hub surface; and a fin disposed on at least one of a pressure surface or a suction surface of the nozzle vane body and disposed within a range of 0.6L from a trailing edge of the nozzle vane body, where L refers to a chord length of the nozzle vane body. The fin satisfies a relationship of 0.3L≤X, where X refers to a length of the fin along a chord direction of the nozzle vane body.

With the above configuration (1), the fin disposed at least one of the pressure surface or the suction surface of the nozzle vane body can apply a force to the nozzle vane body in the rotational axis direction of the nozzle vane, which intersects the flow of exhaust gas, when the exhaust gas flows through the exhaust gas passage. More specifically, the distance between the shroud surface or the hub surface and the nozzle vane body can be appropriately controlled by designing the mounting position and shape of the fin as needed, and thus wear on the shroud surface, the hub surface, or the nozzle vane body caused by contact between the shroud surface or the hub surface and the nozzle vane body can be effectively suppressed. Furthermore, since the fin is disposed within 0.6L from the trailing edge side, where the flow velocity of exhaust gas is faster than at the leading edge, and the length X of the fin along the chord direction of the nozzle vane body is 0.3L or more, the force in the rotational axis direction can be effectively generated.

(2) In some embodiments, in the above configuration (1), the fin may satisfy a relationship of $0.1 < (H_{max}/X) < 0.3$, where $H_{max}$ refers to a maximum height of the fin from the pressure surface or the suction surface on which the fin exists.

With the above configuration (2), since the maximum height $H_{max}$ of the fin is more than 0.1X, the force in the rotational axis direction can be effectively generated from the flow of exhaust gas. Meanwhile, since $H_{max}$ is less than 0.3X, interference between adjacent nozzle vanes can be suppressed when the output power of the variable geometry turbocharger is low, i.e., when the opening degree of the nozzle vanes is low.

(3) In some embodiments, in the above configuration (1) or (2), the fin may satisfy a relationship of $-10°<\alpha<10°$, where $\alpha$ refers to a deflection angle of the fin with respect to the chord direction.

If the deflection angle of the fin with respect to the flow is too large, the pressure loss may increase and the performance of the variable geometry turbocharger may decrease. In this regard, with the above configuration (3), since the deflection angle $\alpha$ of the fin with respect to the flow of exhaust gas is set within ±10°, the pressure loss of the flow of exhaust gas can be reduced while applying the force in the rotational axis direction to the nozzle vane body.

(4) In some embodiments, in any one of the above configurations (1) to (3), a rear end portion of the fin may be located at the trailing edge of the nozzle vane body.

With the above configuration (4), since the rear end portion of the fin is located at the trailing edge, where the flow velocity of exhaust gas is faster than at the leading edge, the force in the rotational axis direction can be effectively generated.

(5) In some embodiments, in any one of the above configurations (1) to (4), the fin may be arranged such that a rear end portion of the fin is closer to the hub surface with respect to a front end portion of the fin.

With the above configuration (5), at least part of exhaust gas flowing from the leading edge side is guided by the fin toward the hub surface as it moves to the trailing edge, i.e., downstream. In this process, the flow velocity of exhaust gas decreases and the pressure becomes relatively high on the hub surface side of the fin, while the flow velocity of exhaust gas increases and the pressure becomes relatively low on the shroud surface side of the fin. Thus, the fin can apply a force to the nozzle vane body toward the shroud surface.

(6) In some embodiments, in any one of the above configurations (1) to (4), the fin may be arranged such that a rear end portion of the fin is closer to the shroud surface with respect to a front end portion of the fin.

With the above configuration (6), at least part of exhaust gas flowing from the leading edge side is guided by the fin toward the shroud surface as it moves to the trailing edge, i.e., downstream. In this process, the flow velocity of exhaust gas decreases and the pressure becomes relatively high on the shroud surface side of the fin, while the flow velocity of exhaust gas increases and the pressure becomes relatively low on the hub surface side of the fin. Thus, the fin can apply a force to the nozzle vane body toward the hub surface.

(7) In some embodiments, in any one of the above configurations (1) to (4), the fin may be arranged along the chord direction.

With the above configuration (7), for example, when bosses exist on the shroud surface or the hub surface, a pressure difference is generated between the area where the bosses exist on both sides of the fin and the area where no bosses exist, so that the fin arranged along the chord direction can apply a force to the nozzle vane body in the direction along the rotational axis of the nozzle vane body.

(8) In some embodiments, in any one of the above configurations (1) to (7), the fin may include a first fin disposed on the suction surface of the nozzle vane body.

The mounting position of the fin on the nozzle vane body may be the pressure surface or the suction surface of the nozzle vane body. In this regard, the inventor's intensive research has revealed that the fin mounted on the pressure surface have a greater influence on the performance of the variable geometry turbocharger than that mounted on the suction surface. Thus, with the above configuration (8), since the first fin is disposed on the suction surface of the nozzle vane body, the force along the rotational axis can be appropriately applied to the nozzle vane body while suppressing the influence on the performance of the variable geometry turbocharger.

(9) In some embodiments, in any one of the above configurations (1) to (7), the fin may include a second fin disposed on the pressure surface of the nozzle vane body.

As described in the above (8), when the fin is mounted on the pressure surface, the influence on the performance of the variable geometry turbocharger is greater than when the fin is mounted on the suction surface. However, for example, when the maximum height $H_{max}$ of the fin is reduced or the length X of the fin along the chord direction is reduced compared to the case where the fin is disposed on the suction surface, it is possible to achieve compatibility between the force in the rotational axis direction and the performance of the variable geometry turbocharger. Thus, with the configuration in which the second fin is disposed on the pressure surface of the nozzle vane body as in the above (9), the force along the rotational axis can be applied to the nozzle vane body while improving the flexibility of design.

(10) In some embodiments, in any one of the above configurations (1) to (7), the fin may include a first fin disposed on the suction surface, and a second fin disposed on the pressure surface.

With the above configuration (10), since the fins are disposed on both the suction surface and the pressure surface, it is possible to control the force in the rotational axis direction more precisely or in a better balance, taking into account both the exhaust gas flow on the suction surface side and the exhaust gas flow on the pressure surface side, compared to the case where there are no fin or where the fin is disposed only on one of the suction surface or the pressure surface, for example.

Advantageous Effects

At least one embodiment of the present disclosure provides a nozzle vane that can control a force to move the nozzle vane body in the rotational axis direction of the nozzle vane body in a variable geometry turbocharger.

BRIEF DESCRIPTION OF DRAWINGS

FIG. 6 are a diagram showing the exhaust gas flow on the suction surface side of the nozzle vane; FIG. 6A shows the exhaust gas flow on the suction surface side of the nozzle vane in a comparative example, and FIG. 6B shows the exhaust gas flow on the suction surface side of the nozzle vane in an embodiment.

FIG. 7 are a diagram showing the static pressure acting on the surface of the nozzle vane in an embodiment.

FIG. 9 are a diagram showing an example of the shape of the nozzle vane according to another embodiment.

FIG. 10 are a diagram showing an example of the shape of the nozzle vane according to another embodiment.

FIG. 11 are a diagram showing an example of the shape of the nozzle vane according to another embodiment.

DETAILED DESCRIPTION

Embodiments of the present invention will now be described in detail with reference to the accompanying drawings. However, the scope of the present invention is not limited to the following embodiments. It is intended that dimensions, materials, shapes, relative positions and the like of components described in the embodiments shall be interpreted as illustrative only and not intended to limit the scope of the present invention.

First, a schematic configuration of a variable geometry turbocharger to which a nozzle vane according to an embodiment of the present disclosure is applied will be described.

Figure 1:
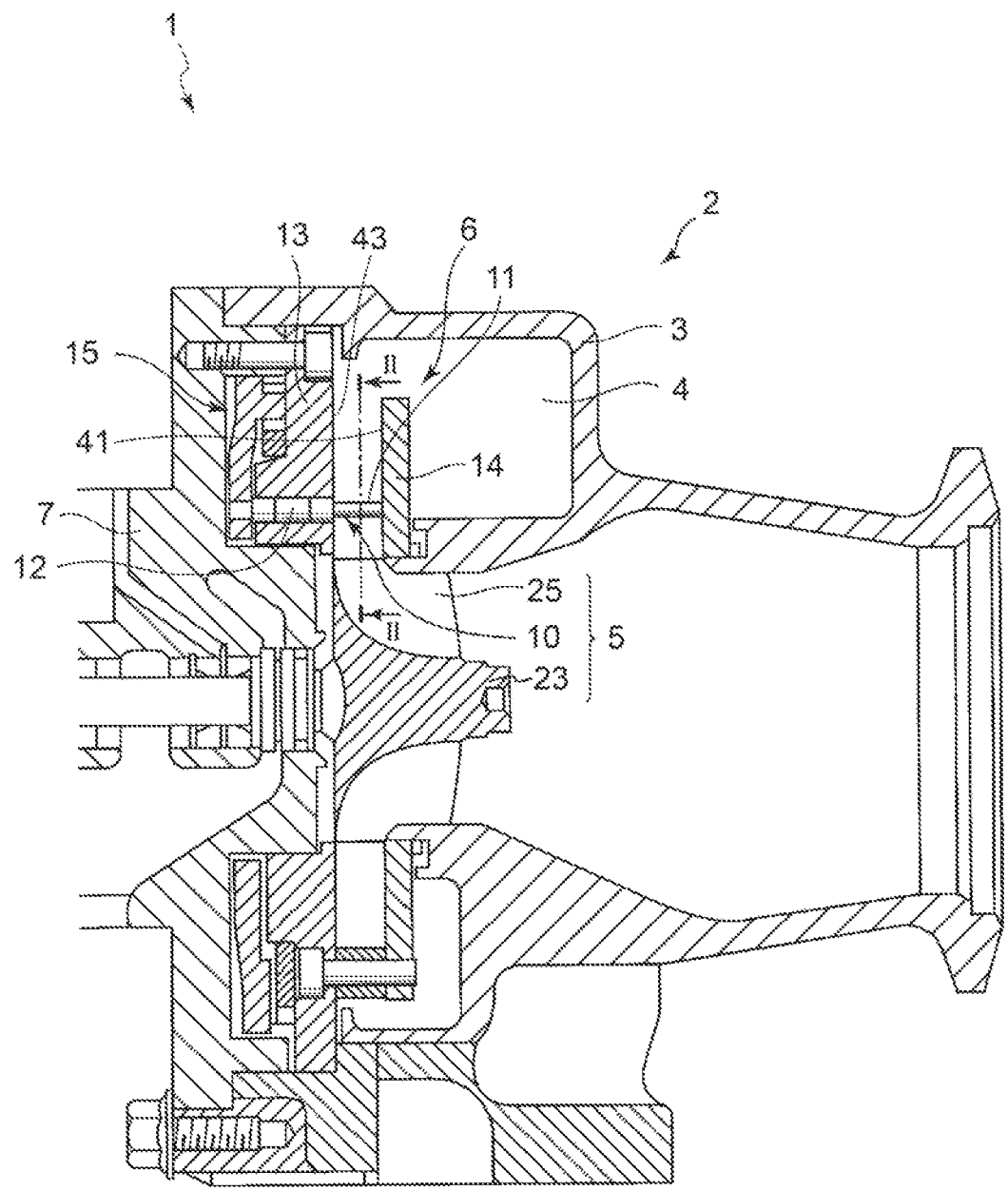
FIG. 1 is a cross-sectional view of a turbine of a variable geometry turbocharger including a nozzle vane according to a first embodiment of the present disclosure.

FIG. 1 is a cross-sectional view of a turbine of a variable geometry turbocharger including a nozzle vane according to a first embodiment of the present disclosure.

As shown in FIG. 1, a turbine 2 of a variable geometry turbocharger 1 includes a turbine housing 3 having a turbine scroll 4 of spiral shape, a turbine wheel 5 rotatably disposed on the radially inner side of the turbine scroll 4 in the turbine housing 3, and a variable nozzle mechanism 6 for controlling the flow passage area of exhaust gas G flowing from the turbine scroll 4 to the turbine wheel 5.

The turbine wheel 5 includes a hub 23 rotatably supported by a bearing housing 7, and a plurality of blades 25 (turbine blades) disposed on the outer circumference of the hub 23 at intervals in the circumferential direction.

The variable nozzle mechanism 6 includes a nozzle 10, a nozzle mount 13 fixed to the bearing housing 7, and a nozzle plate 14 disposed so as to face the nozzle mount 13.

In this disclosure, a partition section including the nozzle plate 14 and the turbine housing 3 surrounding the turbine wheel 5 is referred to as a shroud, the surface of the nozzle plate 14 facing the nozzle mount 13 is referred to as a shroud surface 41, and the surface of the nozzle mount 13 facing the nozzle plate 14 is referred to as a hub surface 43.

The nozzle 10 has a plurality of nozzle vanes 11 disposed so as to surround the turbine wheel 5, and a nozzle shaft 12 fixed to each nozzle vane 11. Each nozzle shaft 12 is rotatably supported to the nozzle mount 13. Each nozzle shaft 12 is connected to an actuator (not shown) via a link mechanism 15. Each nozzle shaft 12 rotates by the torque provided by the actuator. With rotation of each nozzle shaft 12, the nozzle vane 11 rotates.

Figure 2:
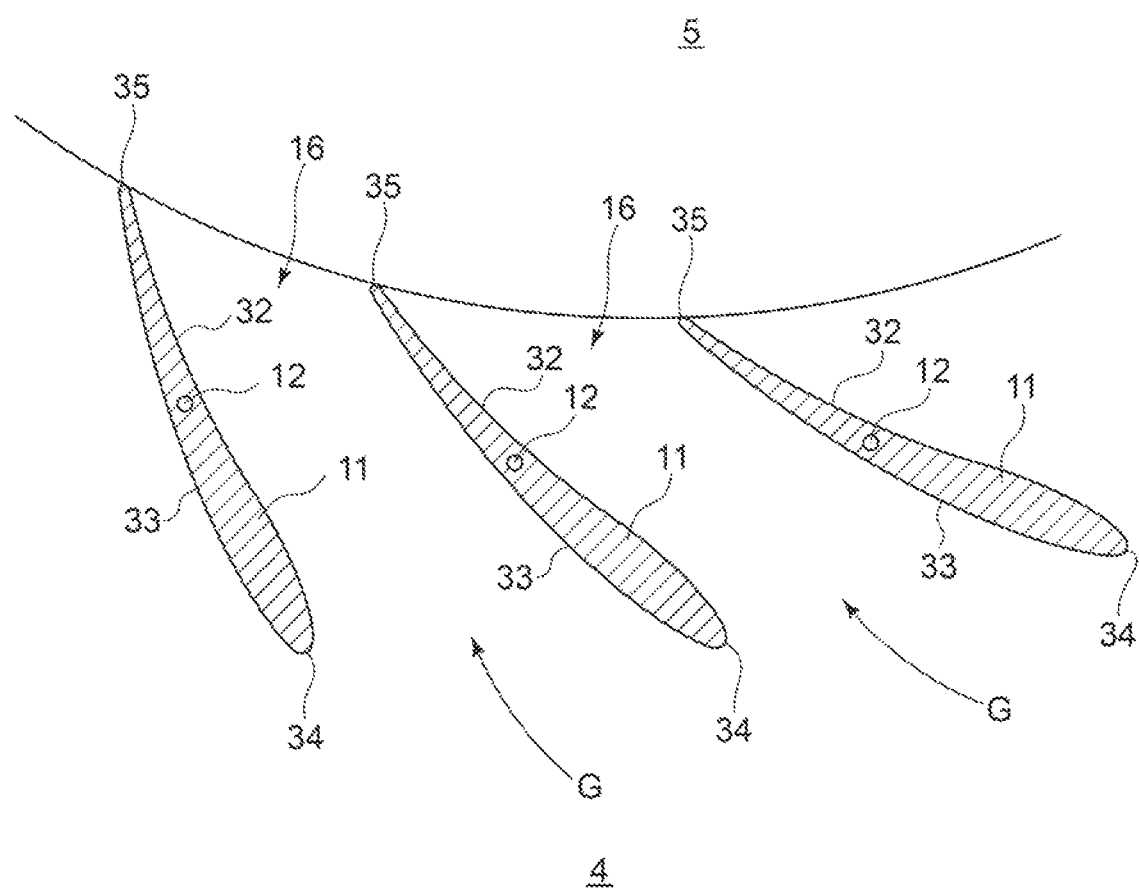
FIG. 2 is a cross-sectional view taken along line II-II in FIG. 1.

As shown in FIG. 2, an exhaust gas passage 16 through which the exhaust gas G having passed through the turbine scroll 4 flows is formed between adjacent nozzle vanes 11, 11. Across the exhaust gas passage 16, a side of the turbine scroll 4 on the outer peripheral side has high pressure due to the exhaust gas G, and a side of the turbine wheel 5 on the inner peripheral side has low pressure. The exhaust gas G having passed through the turbine scroll 4 flows into the exhaust gas passage 16 at a certain flow angle. At this time, the pressure is increased on a pressure surface 32 (described later) of the nozzle vane 11 which faces the flow, while the pressure is low on a suction surface 33 (described later).

Next, the nozzle vane 11 according to an embodiment of the present disclosure will be described in detail.

Figure 3:
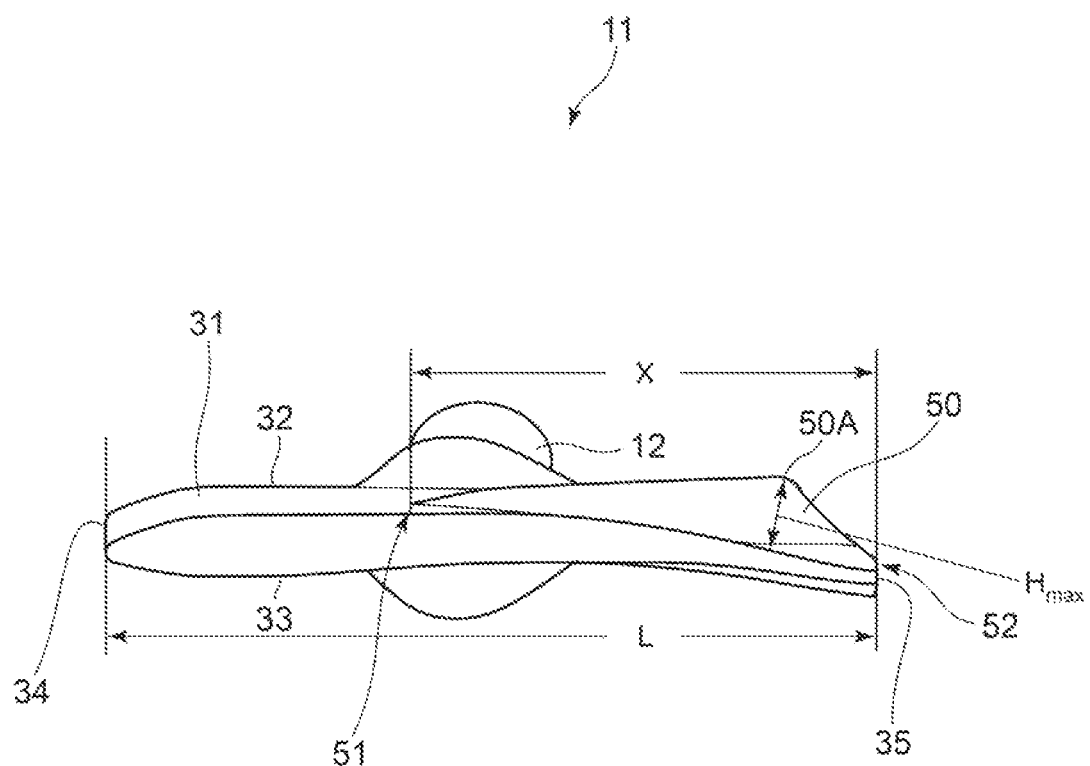
FIG. 3 is a perspective view showing an example of the shape of the nozzle vane according to an embodiment.

FIG. 3 is a perspective view showing an example of the shape of the nozzle vane according to an embodiment. As illustrated in FIG. 3, the nozzle vane 11 according to at least one embodiment of the present invention is the nozzle vane 11 of the variable geometry turbocharger 1 and includes a nozzle vane body 31 rotatably disposed in the exhaust gas passage 16 defined between the shroud surface 41 and the hub surface 43, and a fin 50 disposed on at least one of the pressure surface 32 or the suction surface 33 of the nozzle vane body 31.

The nozzle vane body 31 has an airfoil defined by the pressure surface 32, the suction surface 33 facing the opposite side to the pressure surface 32, the leading edge 34, and the trailing edge 35. The nozzle vane body 31 is rotatably supported by the nozzle mount 13 via the nozzle shaft 12 along the direction perpendicular to the chord direction and parallel to the leading edge 34 or the trailing edge 35 (i.e., the width direction of the nozzle vane body 31) between the leading edge 34 and the trailing edge 35 in the chord direction.

The fin 50 in the present disclosure is convexly formed on the pressure surface 32 or the suction surface 33 of the nozzle vane body 31 with a longitudinal direction in the chord direction of the nozzle vane body 31. In some embodiments, the nozzle vane body 31 may be formed integrally with the fin 50. The fin 50 is disposed within a range of 0.6L from the trailing edge 35 of the nozzle vane body 31, where L refers to the chord length of the nozzle vane body 31.

Further, the fin 50 satisfies a relationship of 0.3L≤X, where X refers to the length of the fin 50 along the chord direction of the nozzle vane body 31. In other words, the fin 50 is arranged relatively closer to the trailing edge 35 on the pressure surface 32 or the suction surface 33 of the nozzle vane body 31, and satisfies the following expression (i):

$$0 < X/L < 0.6 \tag{i}$$

Thus, with the configuration in which the fin 50 is disposed at least one of the pressure surface 32 or the suction surface 33 of the nozzle vane body 31, it is possible to apply a force along the extension direction of the nozzle shaft 12, which coincides with the rotational axis of the nozzle vane 11, intersecting the flow of exhaust gas G to the nozzle vane body 31 when the exhaust gas G flows through the exhaust gas passage 16. More specifically, the distance between the shroud surface 41 or the hub surface 43 and the nozzle vane body 31 can be appropriately controlled by designing the mounting position and shape of the fin 50 as needed, and thus wear on the shroud surface 41, the hub surface 43, or the nozzle vane body 31 caused by contact between the shroud surface 41 or the hub surface 43 and the nozzle vane body 31 can be effectively suppressed. Furthermore, since the fin 50 is disposed within 0.6L from the trailing edge 35 side, where the flow velocity of exhaust gas G is faster than at the leading edge 34, and the length X of the fin 50 along the chord direction of the nozzle vane body 31 is 0.3L or more, the force in the rotational axis 26 direction can be effectively generated.

In some embodiments, in the above configuration, for example as illustrated in FIG. 3, the fin 50 may satisfy a relationship of the following expression (ii):

$$0.1 < (H_{max}/X) < 0.3 \tag{ii}$$

where H refers to the height of the fin 50 from the pressure surface 32 or the suction surface 33 on which the fin 50 exists, and $H_{max}$ refers to the maximum value thereof (i.e., the maximum height of the fin 50).

The chordwise position of the top portion where the fin 50 has the maximum height $H_{max}$ is not limited. In other words, the top portion of the fin 50 may be located in the vicinity of a front end portion 51, a central portion, or a rear end portion 52 in an extension range of the fin 50 in the chord direction of the nozzle vane body 31.

With the configuration in which the maximum height $H_{max}$ of the fin 50 is more than 0.1X, the force along the extension direction of the nozzle shaft 12 can be effectively generated from the flow of exhaust gas G. Meanwhile, when $H_{max}$ is less than 0.3X, interference between adjacent nozzle vanes 11 can be suppressed when the output power of the variable geometry turbocharger 1 is low, i.e., when the opening degree of the nozzle vanes 11 is low.

Figure 4:
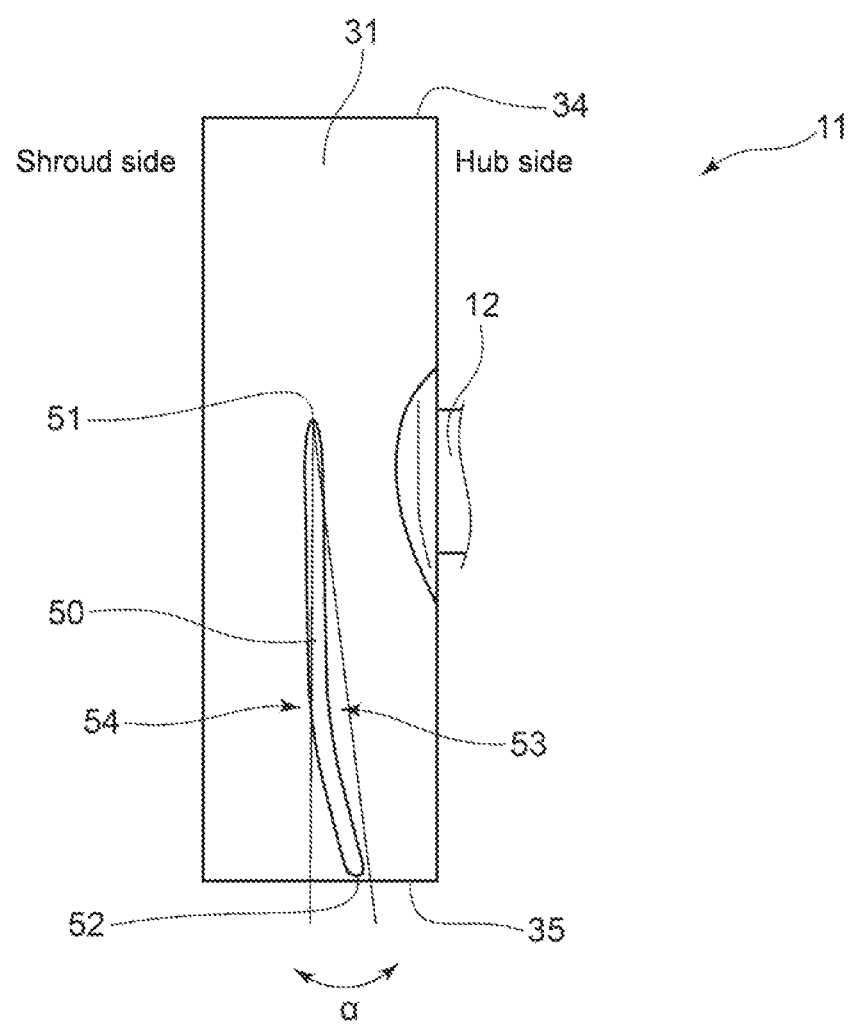
FIG. 4 is a plan view showing an example of the shape of the nozzle vane according to an embodiment when the nozzle vane is viewed from the suction surface side.
Figure 5:
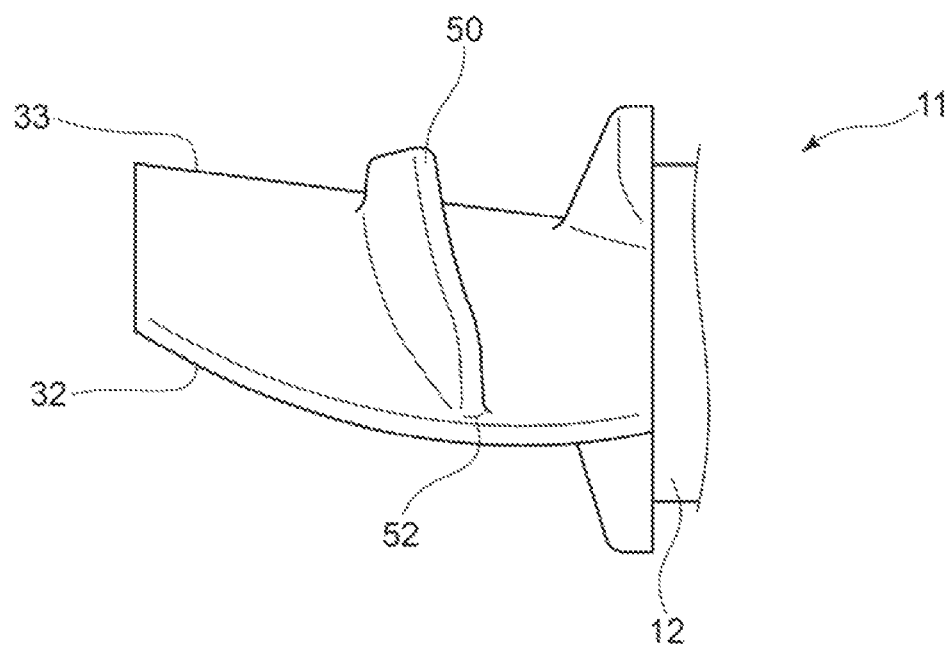
FIG. 5 is a diagram showing an example of the shape of the nozzle vane according to an embodiment when the nozzle vane is viewed from the trailing edge side.

FIG. 4 is a plan view showing an example of the shape of the nozzle vane according to an embodiment when the nozzle vane is viewed from the suction surface side. FIG. 5 is a diagram showing an example of the shape of the nozzle vane according to an embodiment when the nozzle vane is viewed from the trailing edge side.

In some embodiments, for example as illustrated in FIGS. 4 and 5, the fin 50 may satisfy a relationship of the following expression (iii):

$$-10° < \alpha < 10° \tag{iii}$$

where α refers to the deflection angle of the extension direction of the fin 50 with respect to the chord direction of the nozzle vane body 31.

In this case, the fin 50 may be formed in a straight line (flat plate) along the longitudinal direction thereof. Alternatively, the fin 50 may have a shape curved in the width direction of the nozzle vane body 31 from the front end portion 51 to the rear end portion 52. When the fin 50 has a shape curved in the width direction of the nozzle vane body 31, $-10°<\alpha<10°$ may be satisfied for example assuming that a is the deflection angle of the portion of the ridge of the fin 50 that extends in the direction most offset from the chord direction of the nozzle vane body 31.

If the deflection angle of the fin 50 with respect to the flow is too large, the pressure loss may increase and the performance of the variable geometry turbocharger 1 may decrease. In this regard, with the configuration in which the deflection angle $\alpha$ of the extension direction of the fin 50 with respect to the chord direction of the nozzle vane body 31 satisfies $10°<\alpha<10°$, since the deflection angle $\alpha$ of the fin 50 with respect to the flow of exhaust gas G is set within $\pm 10°$, the pressure loss of the flow of exhaust gas G can be reduced while applying the force in the rotational axis 26 direction to the nozzle vane body 31.

In some embodiments, in any of the above configurations, for example, as illustrated in FIGS. 3 to 5, the rear end portion 52 of the fin 50 may be located at the trailing edge 35 of the nozzle vane body 31. In other words, the fin 50 may be arranged with the rear end portion 52 connected to the trailing edge 35 of the nozzle vane body 31, and may extend to near the central portion of the nozzle vane body 31 in the chord direction from the trailing edge 35 toward the leading edge 34 of the nozzle vane body 31.

With this configuration, since the rear end portion 52 of the fin 50 is located at the trailing edge 35, where the flow velocity of exhaust gas G is faster than at the leading edge 34, the force in the extension direction of the nozzle shaft 12 can be effectively generated.

In some embodiments, in any of the above configurations, for example as illustrated in FIGS. 4 and 5, the fin 50 may be arranged such that the rear end portion 52 of the fin 50 is closer to the hub surface 43 with respect to the front end portion 51 of the fin 50.

In other words, the fin 50 may be arranged at an angle to the chord direction of the nozzle vane body 31, with the rear end portion 52 being more biased to the hub surface 43 than the front end portion 51.

With reference to FIGS. 6 and 7, the change in the flow of exhaust gas G by the fin 50 disposed on the nozzle vane 11 will be described. FIGS. 6 and 7 show the magnitude of streamlines and static pressure, respectively, when the fin 50 is arranged on the suction surface 33 of the nozzle vane body 31 such that the rear end portion 52 is closer to the hub surface 43 with respect to the front end portion 51.

First, FIG. 6 are a diagram showing the exhaust gas flow on the suction surface side of the nozzle vane; FIG. 6A shows the exhaust gas flow on the suction surface side of the nozzle vane in a comparative example, and FIG. 6B shows the exhaust gas flow on the suction surface side of the nozzle vane in an embodiment.

In FIGS. 6A and 6B, the left side is the shroud surface 41 side, and the right side is the hub surface 43 side. On the suction surface 33 of the nozzle vane 11 without the fin 50 shown in FIG. 6A, the exhaust gas G flowing from the leading edge 34 side (i.e., the upstream side of the flow of exhaust gas G) has streamlines gathered in the vicinity of the central portion in the width direction of the nozzle vane body 31, and the main flow of exhaust gas G exists in the vicinity of the central portion in the width direction of the nozzle vane body 31 from the leading edge 34 to the trailing edge 35. On the other hand, as shown in FIG. 6B, when the fin 50 is disposed on the suction surface 33 of the nozzle vane body 31, on the trailing edge 35 side, the exhaust gas G guided by the fin 50 flows closer to the hub surface 43. In this case, the change in the flow of exhaust gas G causes a force to the shroud surface 41 act on the nozzle vane body 31.

Figure 7A:
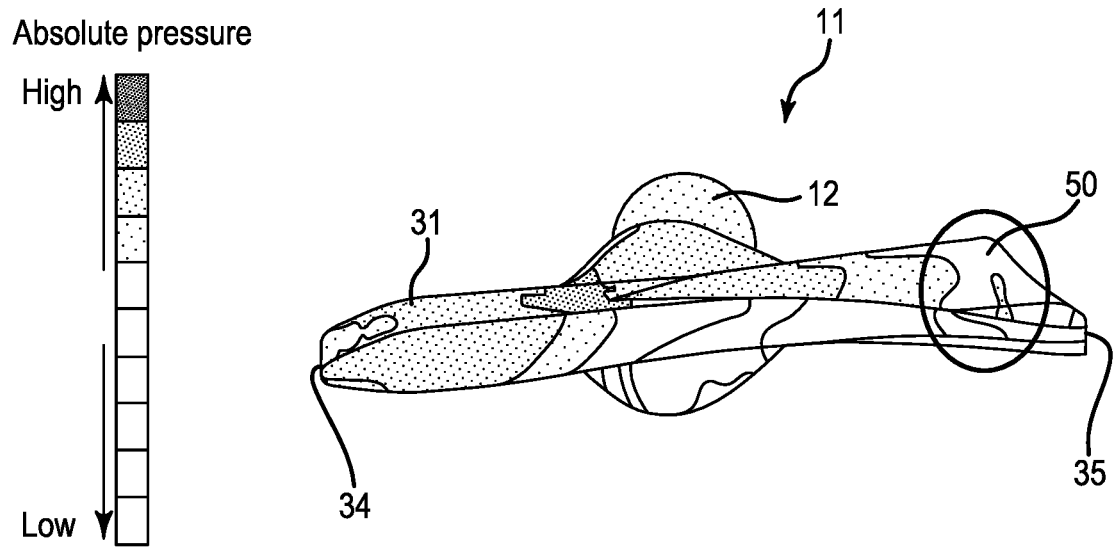
FIG. 7A shows the state viewed from the shroud side.
Figure 7B:
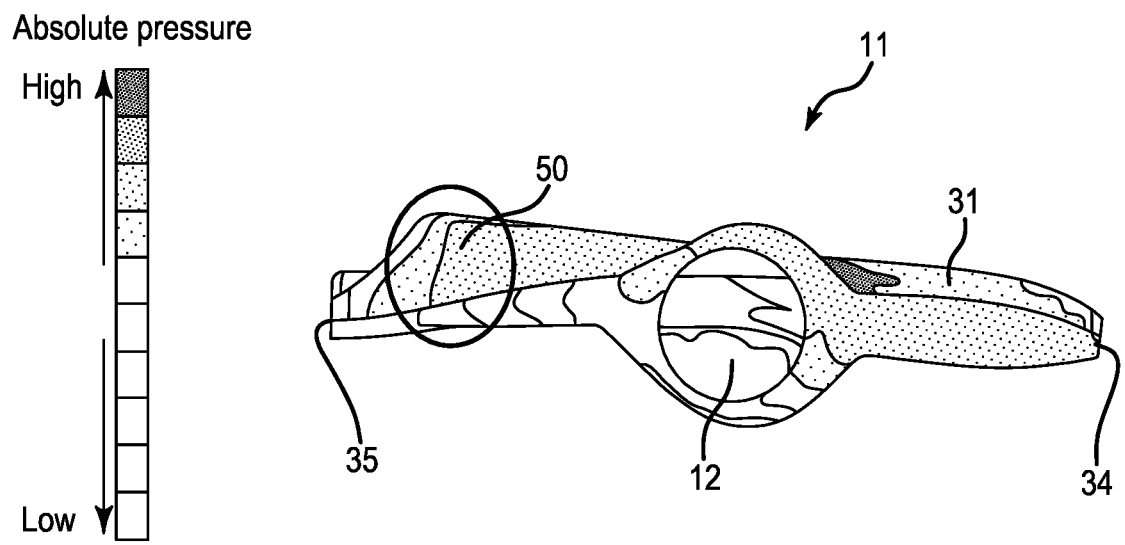
FIG. 7B shows the state viewed from the hub side.

Next, FIG. 7 are a diagram showing the static pressure acting on the surface of the nozzle vane in an embodiment; FIG. 7A shows the state viewed from the shroud side, and FIG. 7B shows the state viewed from the hub side. Referring to FIGS. 7A and 7B, the static pressure is lower on the shroud surface 41 side of the fin 50 than on the hub surface 43 side of the fin 50. Thus, in this case, a force from the hub surface 43 side to the shroud surface 41 side acts on the nozzle vane body 31.

With the configuration in which the rear end portion 52 of the fin 50 is inclined toward the hub surface 43 with respect to the chord direction of the nozzle vane body 31, at least part of exhaust gas G flowing from the leading edge 34 side is guided by the fin 50 toward the hub surface 43 as it moves to the trailing edge 35, i.e., downstream. In this process, the flow velocity of exhaust gas G decreases and the pressure becomes relatively high on the hub surface 43 side of the fin 50, while the flow velocity of exhaust gas G increases and the pressure becomes relatively low on the shroud surface 41 side of the fin 50. Thus, the fin 50 can apply a force to the nozzle vane body 31 toward the shroud surface 41.

Figure 8:
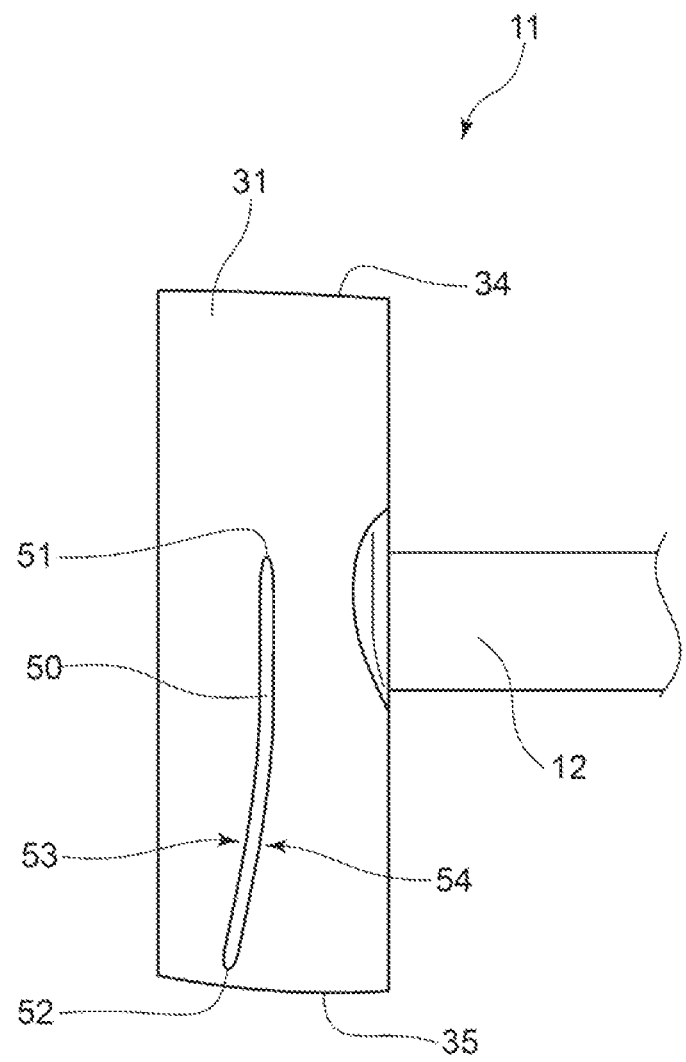
FIG. 8 is a plan view showing an example of the shape of the nozzle vane according to another embodiment when the nozzle vane is viewed from the suction surface side.

FIG. 8 is a plan view showing an example of the shape of the nozzle vane according to another embodiment when the nozzle vane is viewed from the suction surface side.

As illustrated non-limitingly in FIG. 8, in some embodiments, in any of the above configurations, the fin 50 may be arranged such that the rear end portion 52 of the fin 50 is closer to the shroud surface 41 with respect to the front end portion 51 of the fin 50.

In other words, the fin 50 may be arranged at an angle to the chord direction of the nozzle vane body 31, with the rear end portion 52 being more biased to the shroud surface 41 than the front end portion 51.

With the configuration in which the rear end portion 52 of the fin 50 is inclined toward the shroud surface 41 with respect to the chord direction of the nozzle vane body 31, at least part of exhaust gas G flowing from the leading edge 34 side is guided by the fin 50 toward the shroud surface 41 as it moves to the trailing edge 35, i.e., downstream. In this process, the flow velocity of exhaust gas G decreases and the pressure becomes relatively high on the shroud surface 41 side of the fin 50, while the flow velocity of exhaust gas G increases and the pressure becomes relatively low on the hub surface 43 side of the fin 50. Thus, the fin 50 can apply a force to the nozzle vane body 31 toward the hub surface 43.

Figure 9A:
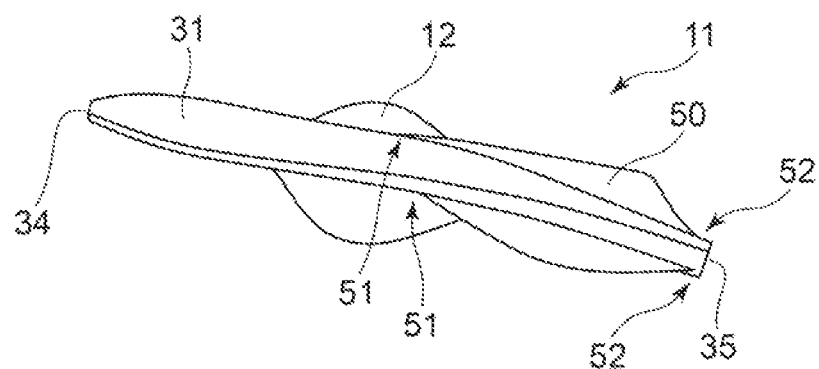
FIG. 9A is a side view from the shroud side.
Figure 9B:
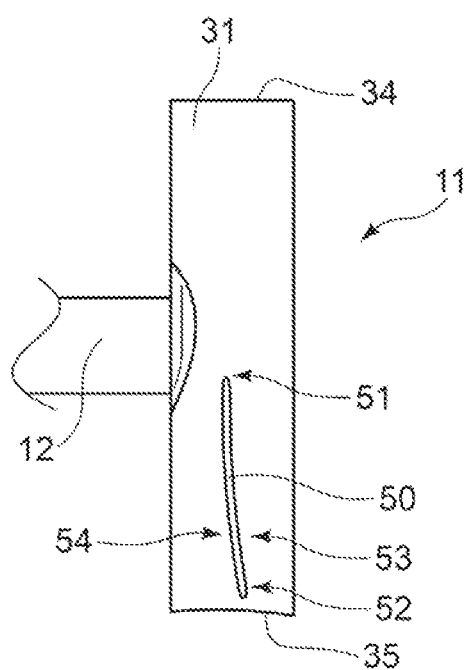
FIG. 9B is a bottom view from the pressure surface side.
Figure 9C:
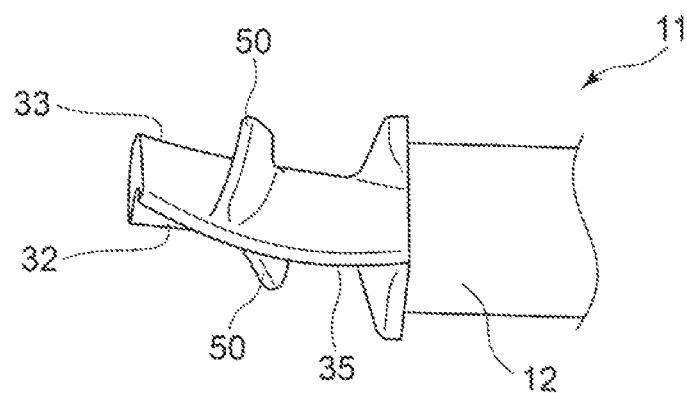
FIG. 9C is a view from the trailing edge side.
Figure 10A:
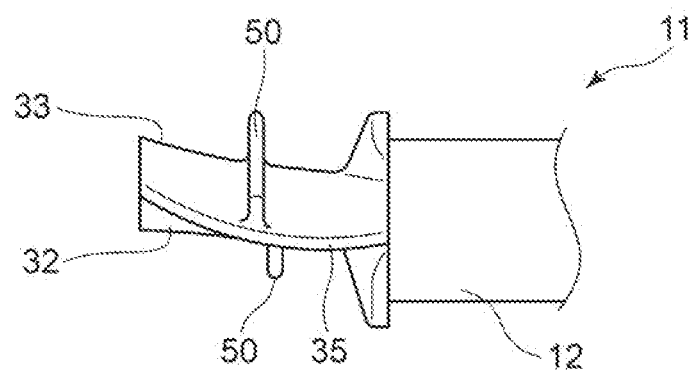
FIG. 10A is a view from the trailing edge side.
Figure 10B:
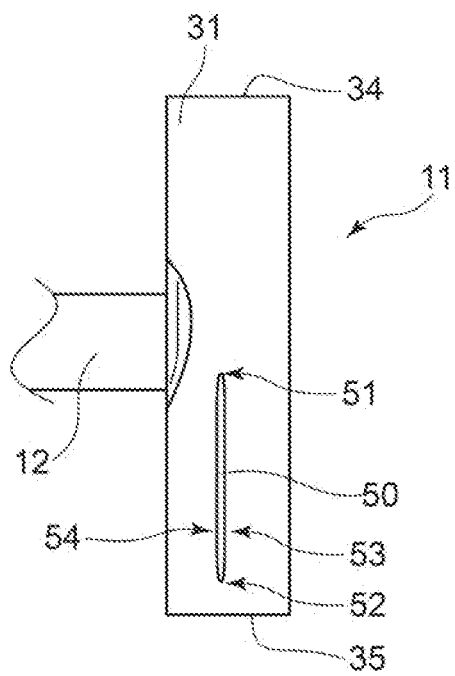
FIG. 10B is a bottom view from the pressure surface side.
Figure 11A:
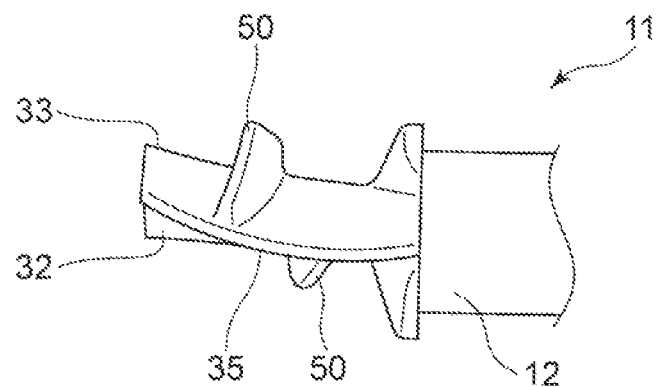
FIG. 11A is a view from the trailing edge side.
Figure 11B:
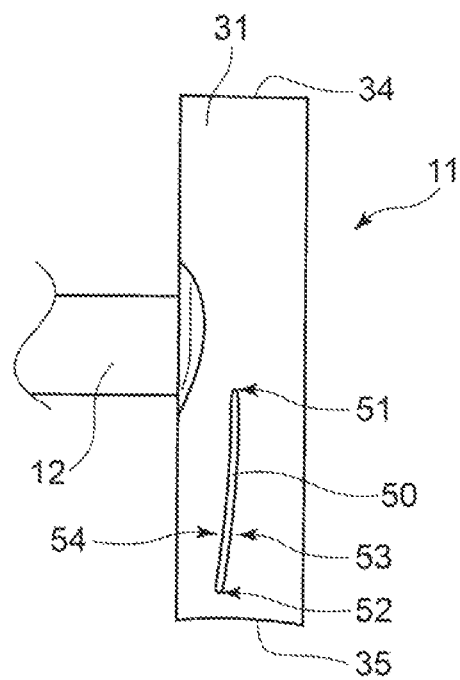
FIG. 11B is a bottom view from the pressure surface side.

FIG. 9 are a diagram showing an example of the shape of the nozzle vane according to another embodiment; FIG. 9A is a side view from the shroud side, FIG. 9B is a bottom view from the pressure surface side, and FIG. 9C is a view from the trailing edge side. FIG. 10 are a diagram showing an example of the shape of the nozzle vane according to another embodiment; FIG. 10A is a view from the trailing edge side, and FIG. 10B is a bottom view from the pressure surface side. FIG. 11 are a diagram showing an example of the shape of the nozzle vane according to another embodiment; FIG. 11A is a view from the trailing edge side, and FIG. 11B is a bottom view from the pressure surface side.

In some embodiments, in any of the above configurations, for example, as illustrated in FIGS. 3 to 11B, the fin 50 may include a first fin 50A disposed on the suction surface 33 of the nozzle vane body 31.

In other words, each of the nozzle vanes 11 may have the fin 50 (first fin 50A) only on the suction surface 33 of the nozzle vane 11.

The mounting position of the fin 50 on the nozzle vane body 31 may be the pressure surface 32 or the suction surface 33 of the nozzle vane body 31. In this regard, the inventor's intensive research has revealed that the fin 50 mounted on the pressure surface 32 have a greater influence on the performance of the variable geometry turbocharger 1 than that mounted on the suction surface 33. Thus, as described above, with the configuration in which the first fin 50A is disposed on the suction surface 33 of the nozzle vane body 31, the force along the extension direction of the nozzle shaft 12 can be appropriately applied to the nozzle vane body 31 while suppressing the influence on the performance of the variable geometry turbocharger 1.

In some embodiments, in any of the above configurations, for example, as illustrated in FIGS. 9A to 9C, 10A, 10B, 11A, and 11B, the fin 50 may include a second fin 50B disposed on the pressure surface 32 of the nozzle vane body 31.

In other words, each of the nozzle vanes 11 may have the fin 50 (second fin 50B) only on the pressure surface 32 of the nozzle vane 11.

As described above, when the fin 50 is mounted on the pressure surface 32, the influence on the performance of the variable geometry turbocharger 1 is greater than when the fin 50 is mounted on the suction surface 33. However, for example, when the maximum height $H_{max}$ of the fin 50 is reduced or the length X of the fin 50 along the chord direction of the nozzle vane body 31 is reduced compared to the case where the fin 50 is disposed on the suction surface 33, it is possible to achieve compatibility between the force in the extension direction of the nozzle shaft 12 and the performance of the variable geometry turbocharger 1. Thus, with the configuration in which the second fin 50B is disposed on the pressure surface 32 of the nozzle vane body 31 as described above, the force along the rotational axis 26 can be applied to the nozzle vane body 31 while improving the flexibility of design.

In some embodiments, in any one of the above configurations, the fin 50 may include a first fin 50A disposed on the suction surface 33, and a second fin 50B disposed on the pressure surface 32.

In other words, each of the nozzle vanes 11 may have the fins 50 on both the suction surface 33 and the pressure surface 32 of the nozzle vane 11 (the first fin 50A disposed on the suction surface 33 of and the second fin 50B disposed on the pressure surface 32). In this case, the first fin 50A and the second fin 50B may be inclined with respect to the chord direction of the nozzle vane body 31 to the same side of the hub surface 43 or the shroud surface 41, or each may be inclined to a different side.

When the fins 50 are disposed on both the pressure surface 32 and the suction surface 33, the length X of each fin 50 in the chord direction of the nozzle vane body 31 or the height H of each fin 50 may be set to the same size. Alternatively, as described above, considering that the influence of the pressure surface 32 on the performance of the variable geometry turbocharger 1 is greater than that of the suction surface 33, the length X or the height H of the second fin 50B disposed on the pressure surface 32 may be made smaller than the length X or the height H of the first fin 50A disposed on the suction surface 33.

Thus, with the configuration in which the fins 50 are disposed on both the suction surface 33 and the pressure surface 32, it is possible to control the force in the extension direction of the nozzle shaft 12 more precisely or in a better balance, taking into account both the exhaust gas flow on the suction surface 33 side and the exhaust gas flow on the pressure surface 32 side, compared to the case where there are no fin 50 or where the fin 50 is disposed only on one of the suction surface 33 or the pressure surface 32, for example.

In some embodiments, in any of the above configurations, for example, as illustrated non-limitingly in FIGS. 10A and 10B, the fin 50 may be arranged along the chord direction of the nozzle vane body 31.

In other words, the fin 50 may be formed in a straight line (flat plate) with a longitudinal direction along the chord direction of the nozzle vane body 31.

In other words, the fin 50 may be formed in a straight line (flat plate) with a longitudinal direction along the chord direction of the nozzle vane body 31.

Thus, with the configuration including the fin 50 arranged along the chord direction of the nozzle vane body 31, when bosses (not shown) exist on the shroud surface 41 or the hub surface 43, a pressure difference is generated between the area where the bosses exist on both sides of the fin 50 and the area where no bosses exist, so that it is possible to apply a force to the nozzle vane body 31 in the direction along the rotational axis of the nozzle vane body 31.

At least one embodiment of the present disclosure provides the nozzle vane 11 that can control a force to move the nozzle vane body 31 in the rotational axis direction of the nozzle vane body 31 in the variable geometry turbocharger 1.

Embodiments of the present invention were described in detail above, but the present invention is not limited thereto, and various amendments and modifications may be implemented.

REFERENCE SIGNS LIST

1 Variable geometry turbocharger
2 Turbine
3 Turbine housing (Shroud)
4 Turbine scroll
5 Turbine wheel (Turbine rotor)
6 Variable nozzle mechanism
7 Bearing housing
10 Nozzle
11 Nozzle vane
12 Nozzle shaft (rotational shaft)
13 Nozzle mount
14 Nozzle plate
15 Link mechanism
16 Exhaust gas passage
23 Hub
25 Turbine blade
31 Nozzle vane body
32 Pressure surface
33 Suction surface
34 Leading edge
35 Trailing edge
41 Shroud surface
43 Hub surface
50 Fin
50A First fin
50B Second fin
51 Front end portion
52 Rear end portion
53 Pressure surface
54 Suction surface
H Fin height
L Chord length (Nozzle vane body)
G Exhaust gas

The invention claimed is:

1. A nozzle vane of a variable geometry turbocharger, comprising:
    a nozzle vane body rotatably disposed in an exhaust gas passage defined between a shroud surface and a hub surface; and
    a fin disposed on at least one of a pressure surface or a suction surface of the nozzle vane body and disposed within a range of 0.6L from a trailing edge of the nozzle vane body, where L refers to a chord length of the nozzle vane body,
    wherein the fin satisfies a relationship of 0.3L≤X, where X refers to a length of the fin along a chord direction of the nozzle vane body.

2. The nozzle vane according to claim 1, wherein the fin satisfies a relationship of $0.1<(H_{max}/X)<0.3$, where $H_{max}$ refers to a maximum height of the fin from the pressure surface or the suction surface on which the fin exists.

3. The nozzle vane according to claim 1, wherein the fin satisfies a relationship of $-10°<\alpha<10°$, where $\alpha$ refers to a deflection angle of the fin with respect to the chord direction.

4. The nozzle vane according to claim 1, wherein a rear end portion of the fin is located at the trailing edge of the nozzle vane body.

5. The nozzle vane according to claim 1, wherein the fin is arranged such that a rear end portion of the fin is closer to the hub surface with respect to a front end portion of the fin.

6. The nozzle vane according to claim 1, wherein the fin is arranged such that a rear end portion of the fin is closer to the shroud surface with respect to a front end portion of the fin.

7. The nozzle vane according to claim 1, wherein the fin is arranged along the chord direction.

8. The nozzle vane according to claim 1, wherein the fin includes a first fin disposed on the suction surface of the nozzle vane body.

9. The nozzle vane according to claim 1, wherein the fin includes a second fin disposed on the pressure surface of the nozzle vane body.

10. The nozzle vane according to claim 1, wherein the fin includes
    a first fin disposed on the suction surface, and
    a second fin disposed on the pressure surface.

* * * * *